(12) United States Patent
Peng et al.

(10) Patent No.: US 11,735,976 B2
(45) Date of Patent: Aug. 22, 2023

(54) ROTOR SHAFT ASSEMBLY, ROTOR AND MOTOR

(71) Applicant: GREE ELECTRIC APPLIANCES, INC. OF ZHUHAI, Qianshan Zhuhai (CN)

(72) Inventors: Liming Peng, Zhuhai (CN); Jinxin Jia, Zhuhai (CN); Xiaobo Zhang, Zhuhai (CN); Jianning Liu, Zhuhai (CN); Fang Zhang, Zhuhai (CN); Guanghai Li, Zhuhai (CN); Changguang Guo, Zhuhai (CN); Qiong Wei, Zhuhai (CN); Zhongyu Li, Zhuhai (CN); Jin Yan, Zhuhai (CN); Jiandong Liang, Zhuhai (CN); Bowen Xiong, Zhuhai (CN); Zeye Wang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 510 days.

(21) Appl. No.: 16/963,660

(22) PCT Filed: Dec. 17, 2018

(86) PCT No.: PCT/CN2018/121458
§ 371 (c)(1),
(2) Date: Jul. 21, 2020

(87) PCT Pub. No.: WO2019/141035
PCT Pub. Date: Jul. 25, 2019

(65) Prior Publication Data
US 2021/0075293 A1    Mar. 11, 2021

(30) Foreign Application Priority Data
Jan. 22, 2018    (CN) .......................... 201810060223.5

(51) Int. Cl.
H02K 7/00    (2006.01)
F16C 3/02    (2006.01)

(52) U.S. Cl.
CPC ............. H02K 7/003 (2013.01); F16C 3/023 (2013.01); F16C 2204/60 (2013.01); F16C 2226/12 (2013.01); F16C 2380/26 (2013.01)

(58) Field of Classification Search
CPC ..... H02K 7/003; F16C 3/023; F16C 2204/60; F16C 2226/12; F16C 2380/26
(Continued)

(56) References Cited

U.S. PATENT DOCUMENTS

2014/0035419 A1*    2/2014  Oka ........................ H02K 1/28
                                                              29/598
2015/0084464 A1     3/2015  Ramdane et al.

FOREIGN PATENT DOCUMENTS

CN    201298773 Y    8/2009
CN    103511444 A    1/2014
(Continued)

OTHER PUBLICATIONS

Machine translation of CN107394951, Wei (Year: 2017).*
(Continued)

*Primary Examiner* — Terrance L Kenerly
(74) *Attorney, Agent, or Firm* — Christensen O'Connor Johnson Kindness PLLC

(57) ABSTRACT

Provided are a rotor shaft assembly, a rotor, and a motor. The rotor shaft assembly includes a magnetic core, a first end shaft, a second end shaft, and a protective sleeve. The protective sleeve is provided, in sequence, with a first through hole, a second through hole, and a third through hole; the first end shaft is disposed through the first through hole, at least part of the magnetic core is arranged inside the
(Continued)

second through hole, and the second end shaft is disposed through the third through hole.

19 Claims, 2 Drawing Sheets

(58) Field of Classification Search
USPC .................................................... 310/75 D
See application file for complete search history.

(56) References Cited

FOREIGN PATENT DOCUMENTS

| | | | | |
|---|---|---|---|---|
| CN | 105449920 A | 3/2016 | | |
| CN | 106100182 A | 11/2016 | | |
| CN | 107394951 | * 11/2017 | ............. | H02K 7/003 |
| CN | 108054867 A | 5/2018 | | |
| CN | 207819654 U | 9/2018 | | |
| DE | 102016211251 A1 | 12/2017 | | |
| EP | 1826884 A1 | 8/2007 | | |
| EP | 2854258 A1 | 4/2015 | | |

OTHER PUBLICATIONS

Machine translation of EP1826884, Maeda (Year: 2007).*
Extended European Search Report dated Feb. 15, 2021, issued in corresponding European Application No. EP 18901557.1, 8 pages.

* cited by examiner

ROTOR SHAFT ASSEMBLY, ROTOR AND MOTOR

CROSS REFERENCE TO RELATED APPLICATIONS

This application is a National Stage of International Application No. PCT/CN2018/121458, filed Dec. 17, 2018, which claims priority to Chinese Patent Application No. 20180060223.5, filed with the Chinese Patent Office on Jan. 22, 2018, which are incorporated by reference herein for all purposes.

TECHNICAL FIELD

The present application relates to the field of motors, and in particular, to a rotor shaft assembly, a rotor, and a motor.

BACKGROUND

For an existing rotor structure of a high-speed permanent magnet motor, referring to FIG. 1, the rotating shaft is composed of three joined segments, and uses a whole cylindrical magnetic steel 3 to transmit a torque, making use of the interference fit between the alloy sheath 4 and the three segments of the main shaft. The first rotating shaft end piece 1 and the second rotating shaft end piece 2 are both made of non-magnetic material. When the first rotating shaft end piece 1 and the cylindrical magnetic steel 3 of the rotor with such a structure are assembled, since no relevant positioning structure is provided, the axes are prone to be misaligned.

SUMMARY OF THE INVENTION

The main objective of the present application is to provide a rotor shaft assembly, a rotor and a motor, so as to solve a problem in prior art that, when an end shaft and a magnetic steel of the rotor shaft assembly are assembled, axes thereof are prone to be misaligned.

In order to realize the objective above, according to a first aspect of the present application, a rotor shaft assembly is provided. The rotor shaft assembly includes: a magnetic core; a first end shaft; a second end shaft; and a protective sleeve; the protective sleeve is provided with a first through hole, a second through hole and a third through hole in sequence; the first end shaft is provided through the first through hole; at least part of the magnetic core is arranged in the second through hole; the second end shaft is provided through the third through hole; a minimum distance between a center line of the protective sleeve and a hole wall of the first through hole is a; a minimum distance between the center line of the protective sleeve and a hole wall of the second through hole is b; and a minimum distance between the center line of the protective sleeve and a hole wall of the third through hole is c; wherein at least one of a and c is unequal to b.

Further, the first end shaft is provided with a first receiving opening, and one portion of the magnetic core is arranged in the first receiving opening; or, a first end of the magnetic core is provided with a second receiving opening, and a portion of the first end shaft is arranged in the second receiving opening.

Further, a clearance fit is formed between the magnetic core and the first receiving opening; or, a clearance fit is formed between the first end shaft and the second receiving opening.

Further, the second end shaft is provided with a third receiving opening, and another portion of the magnetic core is arranged in the third receiving opening; or, a second end of the magnetic core is provided with a fourth receiving opening, and a portion of the second end shaft is arranged in the fourth receiving opening.

Further, a clearance fit is formed between the magnetic core and the third receiving opening; or, a clearance fit is formed between the second end shaft and the fourth receiving opening.

Further, the first end shaft includes a first shaft segment, at least part of the first shaft segment being disposed in the first through hole; a second shaft segment, where the second shaft segment and the first shaft segment are joined; the second shaft segment is disposed outside the first through hole; the first shaft segment is provided with a first receiving opening, and one portion of the magnetic core is arranged in the first receiving opening.

Further, the second end shaft includes a third shaft segment, at least part of the third shaft segment being disposed in the third through hole; a fourth shaft segment, where the fourth shaft segment and the third shaft segment are joined; the fourth shaft segment is disposed outside the third through hole; the third shaft segment is provided with a third receiving opening, and another portion of the magnetic core is arranged in the third receiving opening.

Further, the first through hole is in communication with the second through hole; a diameter value of the first through hole is greater than a diameter value of the second through hole; and the first end shaft abuts against a plane where an opening of the second through hole is located.

Further, the third through hole is in communication with the second through hole; a diameter value of the third through hole is greater than a diameter value of the second through hole; and the second end shaft abuts against a plane where an opening of the second through hole is located.

According to a second aspect of the present application, a rotor is provided, and the rotor includes the rotor shaft assembly above.

According to a third aspect of the present application, a motor is provided, and the motor includes the rotor above.

The rotor shaft assembly of the present application includes the magnetic core, the first end shaft, the second end shaft, and the protective sleeve. By setting different diameter values for all holes in the protective sleeve, which are configured to allow the magnetic core, the first end shaft, and the second end shaft to be arranged, the axial positioning of the protective sleeve can be realized, and the problem that the axes are prone to be misaligned when the end shaft and the magnetic steel of the rotor shaft assembly are assembled can be avoided. The protective sleeve is provided with the first through hole, the second through hole and the third through hole in sequence; the first end shaft is provided through the first through hole; at least part of the magnetic core is arranged in the second through hole; and the second end shaft is provided through the third through hole.

In the rotor shaft assembly of the present application, the minimum distance between the center line of the protective sleeve and the hole wall of the first through hole is a; the minimum distance between the center line of the protective sleeve and the hole wall of the second through hole is b; and the minimum distance between the center line of the protective sleeve and the hole wall of the third through hole is c. By setting at least one of a and c to be unequal to b, the thickness of the protective sleeve can be varied to form the stepped portions to axially position the magnetic core, the first end shaft, and the second end shaft, thereby solving the problem in the art that the axes are prone to be misaligned when the end shaft and the magnetic core of the rotor shaft assembly are assembled.

BRIEF DESCRIPTION OF THE DRAWINGS

The accompanying drawings constituting a part of the present application are provided to further make the present application understood. The illustrative embodiments of the present application and the description are used to explain the present application, but not intended to limit the present application. In the drawings.

Figure 1:
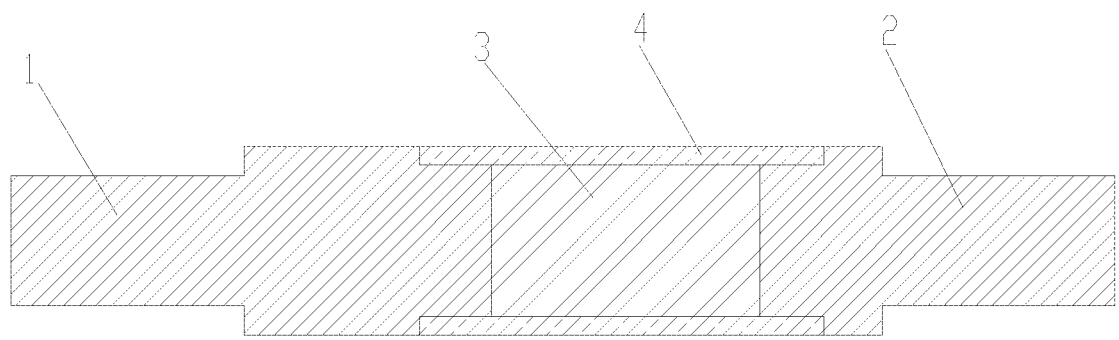
FIG. 1 shows a schematic structural diagram of an embodiment of a rotor shaft assembly in the prior art.

Where the above figures include following reference numerals:

1. first shaft end piece; 2. second shaft end piece; 3. cylindrical magnetic steel; 4. alloy sheath; 10. magnetic core; 20, first end shaft; 21, first shaft segment; 22, second shaft segment; 30, second end shaft; 31, third shaft segment; 32, fourth shaft segment; 40, protective sleeve; 41, first through hole; 42, second through hole; 43, third through hole.

DETAILED DESCRIPTION OF THE PREFERRED EMBODIMENTS

It should be specified that, the embodiments and the features in the embodiments of the present application may be combined with each other if there is no conflict. The embodiments of present application will be described in detail with reference to the accompanying drawings.

It should be noted that the following detailed description is illustrative and intended to provide further explanations of the present application. Unless otherwise specified, all technical and scientific terms in the present disclosure have the same meaning as commonly understood by those ordinary skilled in the art of the present application.

It should be noted that, the terminology herein is used for describing the specific embodiments, but not intended to limit the illustrative embodiments of the present application. The singular terms herein are intended to include their plural unless specific descriptions are provided in context. Additionally, it should be also understood that, the terms "include" and/or "comprise" in the description refer to including the features, steps, operations, devices, components, and/or combinations thereof.

Figure 2:
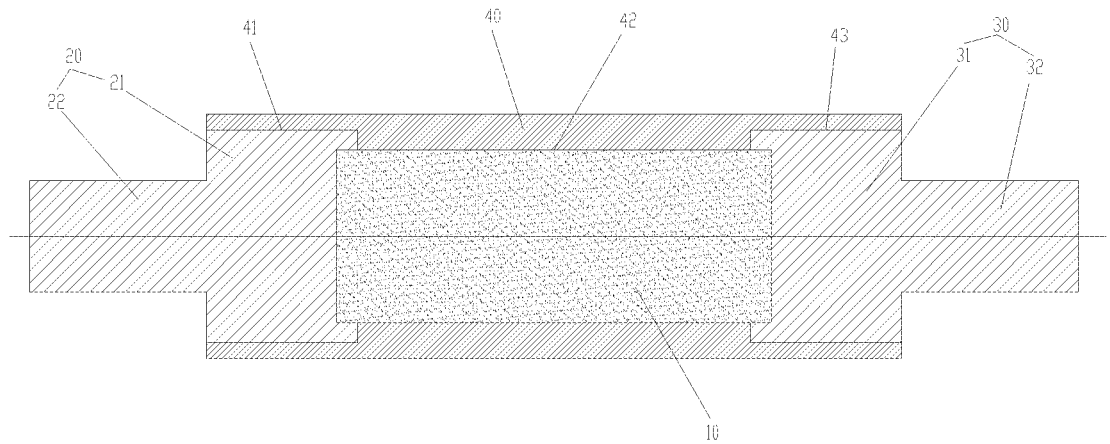
FIG. 2 shows a schematic structural diagram of a first embodiment of a rotor shaft assembly according to the present application.
Figure 3:
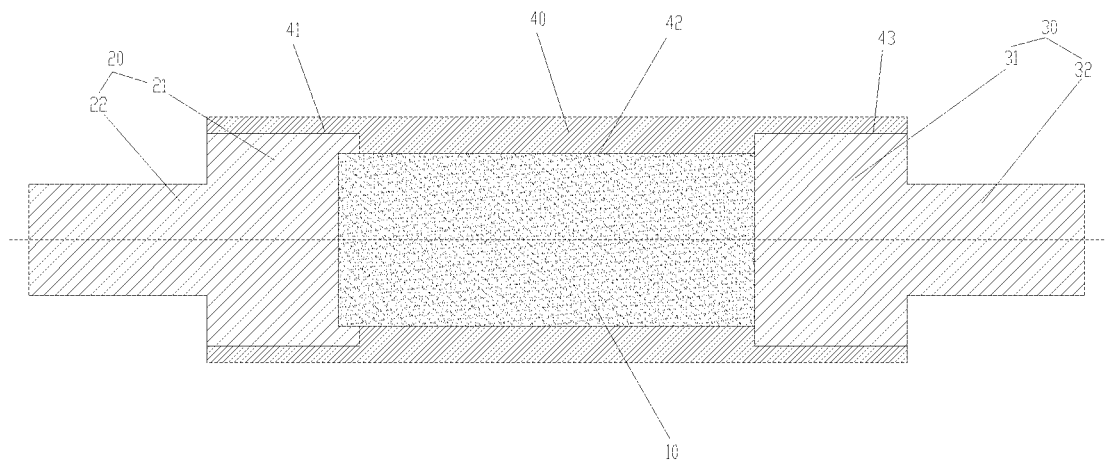
FIG. 3 shows a schematic structural diagram of a second embodiment of the rotor shaft assembly according to the present application.

The present application provides a rotor shaft assembly, referring to FIG. 2 and FIG. 3, the rotor shaft assembly includes a magnetic core 10, a first end shaft 20, a second end shaft 30, and a protective sleeve 40. The protective sleeve 40 is provided with a first through hole 41, a second through hole 42 and a third through hole 43 in sequence. The first end shaft 20 is provided through the first through hole 41; at least part of the magnetic core 10 is arranged in the second through hole 42; and the second end shaft 30 is provided through the third through hole 43. A minimum distance between a center line of the protective sleeve 40 and a hole wall of the first through hole 41 is a; a minimum distance between the center line of the protective sleeve 40 and a hole wall of the second through hole 42 is b; and a minimum distance between the center line of the protective sleeve 40 and a hole wall of the third through hole 43 is c. Where at least one of a and c is unequal to b.

The rotor shaft assembly of the present application includes the magnetic core 10, the first end shaft 20, the second end shaft 30, and the protective sleeve 40. By setting different diameter values for all holes in the protective sleeve 40, which are configured to allow the magnetic core 10, the first end shaft 20 and the second end shaft 30 to be arranged, the axial positioning for the protective sleeve 40 can be realized, and the problem that the axes are prone to be misaligned when the end shafts and the magnetic core of the rotor shaft assembly are assembled can be avoided. The protective sleeve 40 is provided with the first through hole 41, the second through hole 42 and the third through hole 43 in sequence; the first end shaft 20 is provided through the first through hole 41; at least part of the magnetic core 10 is arranged in the second through hole 42; and the second end shaft 30 is provided through the third through hole 43.

In the rotor shaft assembly of the present application, the minimum distance between the center line of the protective sleeve 40 and the hole wall of the first through hole 41 is a; the minimum distance between the center line of the protective sleeve 40 and the hole wall of the second through hole 42 is b; and the minimum distance between the center line of the protective sleeve 40 and the hole wall of the third through hole 43 is c. By setting at least one of a and c to be unequal to b, the thickness of the protective sleeve 40 can be varied to form stepped portions to axially position the magnetic core 10, the first end shaft 20, and the second end shaft 30, thereby solving the problem in the art that the axes are prone to be misaligned when the end shafts and the magnetic steel of the rotor shaft assembly are assembled As for the specific structure of the protective sleeve 40, the protective sleeve 40 is a cylinder, and the first through hole 41, the second through hole 42, and the third through hole 43 are all circular holes, where at least one of the diameter value of the first through hole 41 and the diameter value of the third through hole 43 is greater than the diameter value of the second through hole 42.

In this embodiment, the protective sleeve 40 is a cylinder, and the first through hole 41, the second through hole 42, and the third through hole 43 are all circular holes. Correspondingly, the magnetic core 10, the first end shaft 20, and the second end shaft 30 are all cylinders.

In this embodiment, by setting at least one of the diameter value of the first through hole 41 and the diameter value of the third through hole 43 to be greater than the diameter value of the second through hole 42, a stepped portion is formed between the first through hole 41 and the second through hole 42 to block the first end shaft 20. Optionally, a stepped portion is formed between the third through hole 43 and the second through hole 42 to block the second end shaft 30.

In this embodiment, since at least one of the diameter value of the first through hole 41 and the diameter value of the third through hole 43 is greater than the diameter value of the second through hole 42, a thickness of one portion of the protective sleeve 40 touching the first end shaft 20 and/or the second end shaft 30 is less than a thickness of another portion of the protective sleeve 40 touching the magnetic core 10. The protective sleeve 40 with such a structure above will never fail to protect the magnetic core 10 rotating at a high speed. Moreover, for a portion of the protective sleeve where strength protection is unnecessary, such as a portion radially touching the first end shaft 20 and the second end shaft 30, an eddy current loss of the rotor can be reduced due to a reduced thickness, thereby improving efficiency of the motor.

In order to ensure that, after the first end shaft 20 and the magnetic core 10 are assembled, the center lines thereof are on the same straight line, the first end shaft 20 is provided with a first receiving opening, and one portion of the magnetic core 10 is arranged in the first receiving opening; or, a first end of the magnetic core 10 is provided with a second receiving opening, and another portion of the first end shaft 20 is arranged in the second receiving opening.

In this embodiment, optionally, the first end shaft 20 has the first receiving opening, and the one portion of the magnetic core 10 is arranged in the first receiving opening, thereby ensuring that, after the first end shaft 20 and the magnetic core 10 are assembled, the center lines thereof are on the same straight line.

Optionally, the first end of the magnetic core 10 has the second receiving opening, and the portion of the first end shaft 20 is arranged in the second receiving opening.

Preferably, a clearance fit is formed between the magnetic core 10 and the first receiving opening; or, a clearance fit is formed between the first end shaft 20 and the second receiving opening.

In this embodiment, the small clearance fit between the magnetic core 10 and the first receiving opening can facilitate installation of the magnetic core 10.

Accordingly, the small clearance fit between the first end shaft 20 and the second receiving opening can facilitate installation of the first end shaft 20.

Optionally, an interference fit is formed between the magnetic core 10 and the first receiving opening; or, an interference fit is formed between the first end shaft 20 and the second receiving opening. The interference fits can ensure that the magnetic core 10 and the first end shaft 20 are more stably joined.

In order to ensure that, after the second end shaft 30 and the magnetic core 10 are assembled, the center lines thereof are on the same straight line, the second end shaft 30 is provided with a third receiving opening, and another portion of the magnetic core 10 is arranged in the third receiving opening; or, a second end of the magnetic core 10 is provided with a fourth receiving opening, and a portion of the second end shaft 30 is arranged in the fourth receiving opening.

Preferably, a clearance fit is formed between the magnetic core 10 and the third receiving opening; or, a clearance fit is formed between the second end shaft 30 and the fourth receiving opening.

In this embodiment, the small clearance fit between the magnetic core 10 and the third receiving opening can facilitate the installation of the magnetic core 10.

Correspondingly, the small clearance fit between the second end shaft 30 and the fourth receiving opening can facilitate the installation of the second end shaft 30.

Optionally, an interference fit is formed between the magnetic core 10 and the third receiving opening; or, an interference fit is formed between the second end shaft 30 and the fourth receiving opening. The interference fits can ensure that the magnetic core 10 and the second end shaft 30 are more stably joined.

As for a specific structure of the first end shaft 20, as shown in FIGS. 2 and 3, the first end shaft 20 includes a first shaft segment 21 and a second shaft segment 22; at least part of the first shaft segment 21 is disposed in the first through hole 41; the second shaft segment 22 and the first shaft segment 21 are joined; the second shaft segment 22 is disposed outside the first through hole 41; the first shaft segment 21 is provided with the first receiving opening, and the one portion of the magnetic core 10 is arranged in the first receiving opening.

As for the specific structure of the second end shaft 30, as shown in FIG. 2, the second end shaft 30 includes a third shaft segment 31 and a fourth shaft segment 32; at least part of the third shaft segment 31 is disposed in the third through hole 43; the fourth shaft segment 32 and the third shaft segment 31 are joined; the fourth shaft segment 32 is disposed outside the third through hole 43; the third shaft segment 31 is provided with the third receiving opening, and the other portion of the magnetic core 10 is arranged in the third receiving opening.

Preferably, the first through hole 41 is in communication with the second through hole 42; the diameter value of the first through hole 41 is greater than the diameter value of the second through hole 42; and the first end shaft 20 abuts against a first plane where a first opening of the second through hole 42 is located.

Preferably, the third through hole 43 is in communication with the second through hole 42; the diameter value of the third through hole 43 is greater than the diameter value of the second through hole 42; and the second end shaft 30 abuts against a second plane where a second opening of the second through hole 42 is located.

The first end shaft 20 and the second end shaft 30 are made of non-magnetic material. When rotating at a high speed, the permanent magnet rotor can operate safely due to the protection of the protective sleeve 40.

The cylindrical magnetic steel (the magnetic core 10) is made of neodymium iron boron (NdFeB) material, and has a regular and integral cylindrical solid structure.

The alloy protective sleeve 40 with variable thicknesses is made of nickel-based alloy, titanium alloy, or any other material, and interference fits are formed between the protective sleeve and the magnetic core 10, between the protective sleeve and the first end shaft 20, and between the protective sleeve and the second end shaft 30 respectively.

In a process of assembling, at first, the cylindrical magnetic steel is installed on a right end surface of the first end shaft 20. Due to an centering effect of the structure of the receiving opening of the first end shaft 20, an outer circular surface of the cylindrical magnetic steel and a circular surface of the receiving opening of the first end shaft 20 coincide with each other highly, accordingly, the coaxiality between the cylindrical magnetic steel and the first end shaft 20 is ensured. Then the alloy protective sleeve with variable thicknesses, after being heated to a certain temperature, is assembled on the outer surfaces of the first end shaft 20 and the cylindrical magnetic steel at one time by means of heat charge, making the left stepped portion of the alloy protective sleeve fit with the right end surface of the first end shaft 20. The second end shaft 30 can be quickly arranged in the alloy protective sleeve. After being cooled naturally for a period of time, the assembling of the rotor shaft assembly is completed.

It should be noted that, in the entire cooling process, an axial pre-tightening force is necessarily exerted on the first end shaft 20 and the second end shaft 30, and cannot be removed until the rotor shaft assembly is cooled to a normal temperature.

First Embodiment of the Rotor Shaft Assembly of the Present Application

As shown in FIG. 2, the first end shaft 20 includes the first shaft segment 21 and the second shaft segment 22; the second end shaft 30 includes the third shaft segment 31 and the fourth shaft segment 32; at least part of the first shaft segment 21 is disposed in the first through hole 41; the second shaft segment 22 and the first shaft segment 21 are joined; the second shaft segment 22 is disposed outside the first through hole 41; at least part of the third shaft segment 31 is disposed in the third through hole 43; the fourth shaft segment 32 and the third shaft segment 31 are joined; and the fourth shaft segment 32 is disposed outside the third through hole 43.

In this embodiment, the first shaft segment 21 is provided with the first receiving opening; the one portion of the magnetic core 10 is arranged in the first receiving opening; the third shaft segment 31 is provided with the third receiving opening; and the other portion of the magnetic core 10 is arranged in the third receiving opening.

The first shaft segment 21 is provided with the first receiving opening, and the one portion of the magnetic core 10 is arranged in the first receiving opening, thereby reducing complexity of assembling and improving success rate of assembling, and greatly reducing processing cost of permanent magnetic materials as well.

Second Embodiment of the Rotor Shaft Assembly of the Present Application

As shown in FIG. 3, the first end shaft 20 includes the first shaft segment 21 and the second shaft segment 22; the second end shaft 30 includes the third shaft segment 31 and the fourth shaft segment 32; at least part of first shaft segment 21 is disposed in the first through hole 41; the second shaft segment 22 and the first shaft segment 21 are joined; the second shaft segment 22 is disposed outside the first through hole 41; at least part of the third shaft segment 31 is disposed in the third through hole 43; the fourth shaft segment 32 and the third shaft segment 31 are joined; and the fourth shaft segment 32 is disposed outside the third through hole 43.

In this embodiment, the first shaft segment 21 is provided with the first receiving opening; the one portion of the magnetic core 10 is arranged in the first receiving opening; and the third shaft segment 31 abuts against the magnetic core 10.

The present application also provides a rotor including a rotor shaft assembly, and the rotor shaft assembly is the above-mentioned rotor shaft assembly.

The present application also provides a motor including a rotor, and the rotor is the above-mentioned rotor.

From the above description, it can be seen that the above embodiments of the present application have achieved following technical effects:

The rotor shaft assembly of the present application includes the magnetic core 10, the first end shaft 20, the second end shaft 30, and the protective sleeve 40. By setting different diameter values for all holes in the protective sleeve 40, which are configured to allow the magnetic core 10, the first end shaft 20, and the second end shaft 30 to be arranged, the axial positioning of the protective sleeve 40 can be realized, and the problem that the axes are prone to be misaligned when the end shaft and the magnetic steel of the rotor shaft assembly are assembled can be avoided. The protective sleeve 40 is provided with the first through hole 41, the second through hole 42 and the third through hole 43 in sequence; the first end shaft 20 is provided through the first through hole 41; at least part of the magnetic core 10 is arranged in the second through hole 42; and the second end shaft 30 is provided through the third through hole 43.

In the rotor shaft assembly of the present application, the minimum distance between the center line of the protective sleeve 40 and the hole wall of the first through hole 41 is a; the minimum distance between the center line of the protective sleeve 40 and the hole wall of the second through hole 42 is b; and the minimum distance between the center line of the protective sleeve 40 and the hole wall of the third through hole 43 is c. By setting at least one of a and c to be unequal to b, the thickness of the protective sleeve 40 can be varied to form the stepped portions to axially position the magnetic core 10, the first end shaft 20, and the second end shaft 30, thereby solving the problem in the art that the axes are prone to be misaligned when the end shaft and the magnetic core of the rotor shaft assembly are assembled.

It should be specified that the terms "first", "second", etc. in the description, the claims and the drawings in the present application are just used to distinguish similar objects, but not used to describe a specific order or an order of priority. It should be understood that such terms may be interchangeable under appropriate conditions, such that the embodiments of the present application illustrated in the drawing or described herein can be implemented, for example, in a sequence other than the sequences illustrated or described herein. In addition, the terms "comprise", "have" and any variations thereof are intended to cover a non-exclusive inclusion. For example, a process, a method, a system, a product, or a device that includes a series of steps or units is not limited to those steps or units listed clearly, but may include other steps or units, which are not clearly listed, or which are inherent to such a process, a method, a product or a device.

For the convenience of description, terms of spatial relations such as "above", "over", "on a top surface", "upper", etc., may be used herein to describe the spatial position relationships of a device or a feature with other devices or features shown in the drawings. It should be understood that the terms of spatial relations are intended to include other different orientations in use or operation in addition to the orientation of the device described in the drawings. For example, if the device in the drawings is placed upside down, the device described as "above other devices or structures" or "over other devices or structures" will be positioned as "below other devices or structures" or "under other devices or structures". Thus, the exemplary term "above" may include both "above" and "below". The device can also be positioned in other different ways (rotating 90 degrees or at other orientations), and the corresponding explanations for the description of the spatial relations will be provided herein.

What described above are preferred embodiments of the present application, but not intended to limit the present application. For those skilled in the art, various amendments and modifications can be made. Any modifications, equivalent substitutions and improvements made within the spirits and principles of the present application are all within the scope of the present application.

What is claimed is:

1. A rotor shaft assembly, comprising:
   a magnetic core;
   a first end shaft;
   a second end shaft; and
   a protective sleeve; wherein the protective sleeve is provided with a first through hole, a second through hole and a third through hole in sequence; the first end shaft is provided through the first through hole; at least part of the magnetic core is arranged in the second through hole; the second end shaft is provided through the third through hole;
   a minimum distance between a center line of the protective sleeve and a hole wall of the first through hole is a; a minimum distance between the center line of the protective sleeve and a hole wall of the second through hole is b; and a minimum distance between the center line of the protective sleeve and a hole wall of the third through hole is c; wherein at least one of a and c is unequal to b; and the protective sleeve is a cylinder; the first through hole, the second through hole, and the third through hole are all cylindrical holes; and at least one of a diameter value of the first through hole and a diameter value of the third through hole is greater than a diameter value of the second through hole.

2. The rotor shaft assembly according to claim 1, wherein, the first end shaft is provided with a first receiving opening, and one portion of the magnetic core is arranged in the first receiving opening; or, a first end of the magnetic core is provided with a second receiving opening.

3. The rotor shaft assembly according to claim 2, wherein, a clearance fit is formed between the magnetic core and the first receiving opening.

4. The rotor shaft assembly according to claim 2, wherein an interference fit is formed between the magnetic core and the first receiving opening.

5. The rotor shaft assembly according to claim 1, wherein, the second end shaft is provided with a third receiving opening, and another portion of the magnetic core is arranged in the third receiving opening.

6. The rotor shaft assembly according to claim 5, wherein, a clearance fit is formed between the magnetic core and the third receiving opening.

7. The rotor shaft assembly according to claim 5, wherein, an interference fit is formed between the magnetic core and the third receiving opening.

8. The rotor shaft assembly according to claim 1, wherein, the first end shaft comprises:
 a first shaft segment, at least part of the first shaft segment being disposed in the first through hole;
 a second shaft segment, wherein, the second shaft segment and the first shaft segment are joined; the second shaft segment is disposed outside the first through hole;
 the first shaft segment is provided with a first receiving opening, and one portion of the magnetic core is arranged in the first receiving opening.

9. The rotor shaft assembly according to claim 1, wherein, the second end shaft comprises:
 a third shaft segment, at least a part of the third shaft segment being disposed in the third through hole;
 a fourth shaft segment, wherein the fourth shaft segment and the third shaft segment are joined; the fourth shaft segment is disposed outside the third through hole;
 the third shaft segment is provided with a third receiving opening, and another portion of the magnetic core is arranged in the third receiving opening.

10. The rotor shaft assembly according to claim 1, wherein, the first through hole is in communication with the second through hole; a diameter value of the first through hole is greater than a diameter value of the second through hole; and the first end shaft abuts against a first plane where a first opening of the second through hole is located.

11. The rotor shaft assembly according to claim 1, wherein, the third through hole is in communication with the second through hole; a diameter value of the third through hole is greater than a diameter value of the second through hole; and the second end shaft abuts against a second plane where a second opening of the second through hole is located.

12. A rotor, comprising a rotor shaft assembly of claim 1.

13. A motor, comprising a rotor of claim 12.

14. The rotor shaft assembly according to claim 1, wherein, a first end of the magnetic core is provided with a second receiving opening, and a portion of the first end shaft is arranged in the second receiving opening.

15. The rotor shaft assembly according to claim 14, wherein, a clearance fit is formed between the first end shaft and the second receiving opening.

16. The rotor shaft assembly according to claim 14, wherein, an interference fit is formed between the first end shaft and the second receiving opening.

17. The rotor shaft assembly according to claim 1, wherein, a second end of the magnetic core is provided with a fourth receiving opening, and a portion of the second end shaft is arranged in the fourth receiving opening.

18. The rotor shaft assembly according to claim 17, wherein, a clearance fit is formed between the second end shaft and the fourth receiving opening.

19. The rotor shaft assembly according to claim 17, wherein, an interference fit is formed between the second end shaft and the fourth receiving opening.

\* \* \* \* \*